(12) United States Patent
Eggebrecht et al.

(10) Patent No.: US 6,302,638 B1
(45) Date of Patent: Oct. 16, 2001

(54) COMBINED PUSHING MECHANISM AND DEAD PLATE FOR STACKER ACCUMULATION TRAY

(75) Inventors: Todd R. Eggebrecht; Jason M. Knas, both of Mukwonago, WI (US)

(73) Assignee: Dorner Mfg. Corp., Hartland, WI (US)

( * ) Notice: Subject to any disclaimer, the term of this patent is extended or adjusted under 35 U.S.C. 154(b) by 0 days.

(21) Appl. No.: 09/439,863

(22) Filed: Nov. 12, 1999

(51) Int. Cl.[7] .................................................. B65G 57/00
(52) U.S. Cl. ..................... 414/798.7; 271/181; 414/790.3
(58) Field of Search ..................................... 271/181, 215, 271/149; 414/790.3, 798.6, 798.7

(56) References Cited

U.S. PATENT DOCUMENTS

| | | |
|---|---|---|
| 4,526,501 | 7/1985 | Blumle . |
| 4,834,606 | 5/1989 | Burns et al. ................. 414/795.3 |
| 4,897,017 | 1/1990 | Castiglioni ................. 414/790.8 |
| 5,044,877 * | 9/1991 | Constant et al. ............ 271/149 X |
| 5,112,042 * | 5/1992 | Tilles et al. ................... 271/181 X |
| 5,347,790 * | 9/1994 | Romanenko et al. ....... 414/790.3 X |
| 5,707,204 | 1/1998 | Haase .............................. 414/790 |
| 5,727,674 | 3/1998 | St. John et al. ................ 198/809 |

FOREIGN PATENT DOCUMENTS

| | | | |
|---|---|---|---|
| 0 286 886 * | 10/1988 | (EP) ................................. 414/798.7 |
| 1 412 417 * | 8/1965 | (FR) ................................. 414/798.7 |
| 2-286566 * | 11/1990 | (JP) .................................... 271/149 |

* cited by examiner

*Primary Examiner*—Janice L. Krizek
(74) *Attorney, Agent, or Firm*—Andrus, Sceales, Starke & Sawall, LLP

(57) ABSTRACT

A retractable arm serves as a combined pushing mechanism and dead plate for holding and moving articles that have been stacked onto an accumulation tray for a stacking station in an article sortation conveying system. The stacking station stacks articles sequentially onto the accumulation tray standing upright on edge and in series side-by-side. While the articles are being stacked, the retractable arm is positioned in the down position and positioned so that a first side of the arm holds the articles on edge without tipping, much like a bookend. A linear motion actuator, preferably a pneumatic cylinder, moves the retractable arm along the length of the elongated accumulation tray. During the stacking procedure, the pneumatic cylinder is deactivated (i.e. a dead cylinder), and the stacked articles push the retractable arm incrementally along the accumulation tray towards an unloading area. When the order is complete, the arm retracts and is returned to a home position in which a second side of the arm is ready to push the articles towards the unload end of the accumulation tray. Movement of the articles towards the unload end of the accumulation tray is controlled in response to a photoelectric sensor that senses the presence of articles at a location near the unload end of the tray. When the entire order of articles has been moved to the unload area of the accumulation tray, the retractable arm is returned to the home position ready to accept the next stack of articles.

4 Claims, 5 Drawing Sheets

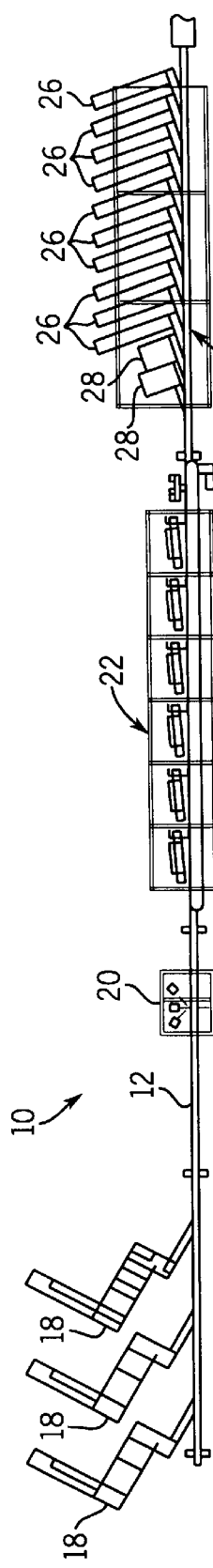
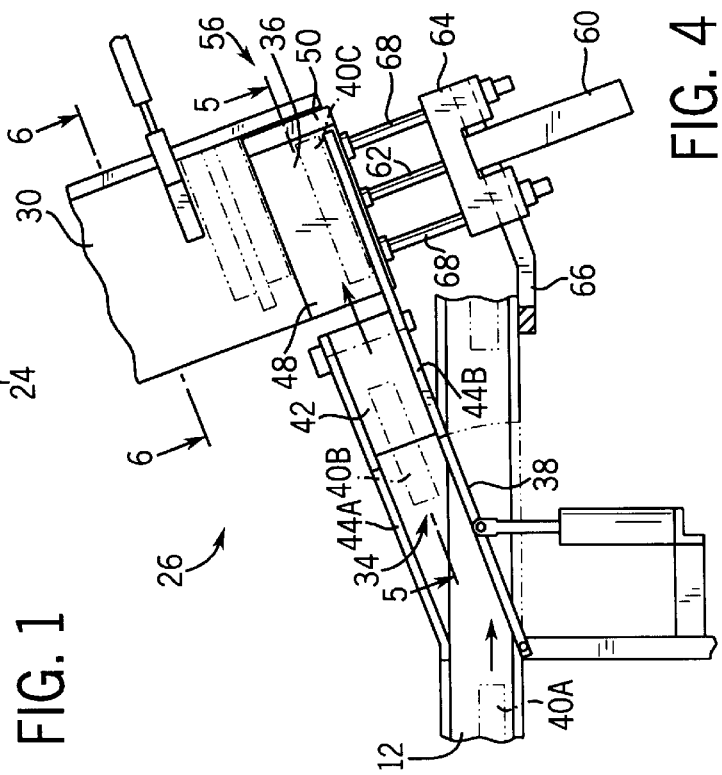
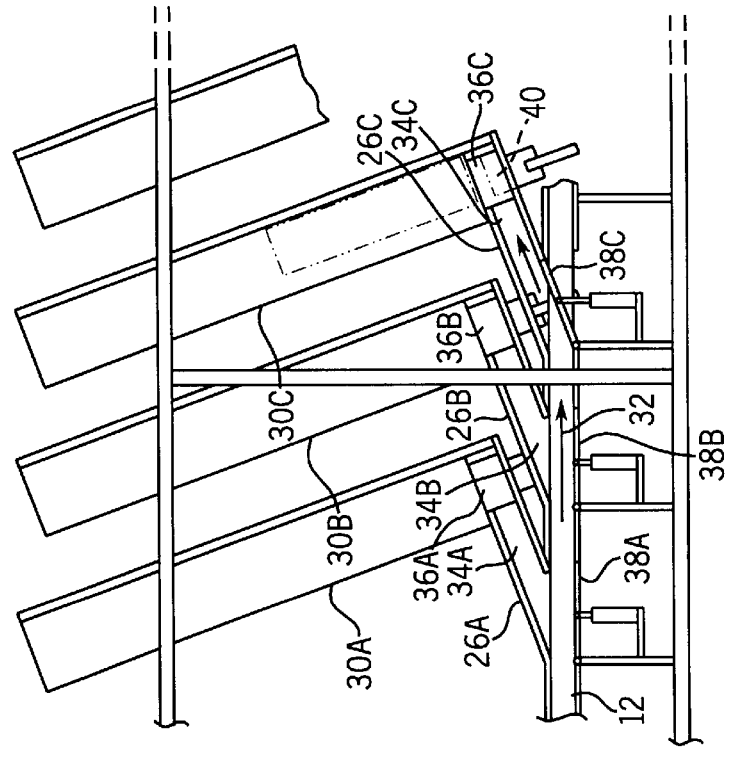

COMBINED PUSHING MECHANISM AND DEAD PLATE FOR STACKER ACCUMULATION TRAY

FIELD OF THE INVENTION

The invention relates to stacking stations on sortation conveying systems used to sort large orders of substantially rectangular articles, such as assorted books, packaged compact discs, packaged video cassettes, boxed software etc. More specifically, the invention relates to a mechanism that facilitates convenient removal of articles from the stacking station.

BACKGROUND OF THE INVENTION

In large distribution applications, sortation conveying systems are typically used to fulfill orders of intermingled articles such as assortments of books, video cassette containers, packaged software, compact disc containers, etc. Workers load items into the system and the articles are conveyed in single file within individual pockets on a core conveyor belt. As the assorted articles begin to move through the system on the core conveyor belt, the system reads preprinted bar code information and automatically sorts the articles into various outgoing orders. The downstream end of the sortation conveyance system normally includes a system of computer controlled diverting gates that divert articles into appropriate stacking stations for outgoing orders. Outgoing orders typically contain 100 or more articles. If an article is loaded onto the core conveyor, and it is not needed for any of the outgoing orders, it is discharged into a left over bin and returned to stock.

The assignee of the present application has developed an improved stacking station in which articles for a particular order are stacked onto an elongated and substantially horizontal accumulation tray. The articles are stacked sequentially onto the tray such that the articles are standing upright on edge, and in series side-by-side. This system is disclosed in detail in copending patent application Ser. No. 09/439,862 entitled "Discharge Stacking Station for Sortation Conveying System" by David A. Remsing, Jason M. Knas and Todd R. Eggebrecht filed on Nov. 12, 1999 incorporated herein by reference.

The disclosed discharge stacking station includes an accumulation tray that has substantial length in order to accommodate large orders of articles (e.g. preferably about 4–12 feet). The accumulation tray extends from the loading mechanism for the stacking station perpendicularly outward, and workers unload the articles for a particular order from the opposite end of the accumulation tray. Preferably, the tray has a bottom wall and a backstop wall which extends perpendicularly upward from a rear edge of the bottom wall. The bottom wall of the accumulation tray is preferably tilted downward towards the rear edge so that the force of gravity assists the alignment of articles in the accumulation tray (e.g., alignment along the bottom wall and the back wall).

As disclosed in the above referenced copending application, the stacking station preferably includes a dead plate on the accumulation tray which acts much like a bookend to stabilize the series of articles being stacked onto the accumulation tray. The dead plate is connected to a pneumatic cylinder that moves the dead plate linearly along the horizontal length of the accumulation tray. Before the first article is stacked onto the accumulation tray, the dead plate is positioned near the loading end of the accumulation tray. Then, the pneumatic cylinder is deactivated (i.e. the dead plate is connected to a dead cylinder). When the articles are being stacked onto the accumulation tray, the dead plate abuts the first stacked article to prevent tipping of the article in the accumulation tray. As additional articles are stacked onto the accumulation tray, the dead plate attached to the dead cylinder moves incrementally along the accumulation tray. It has been found that use of a dead cylinder provides the dead plate with sufficient resistance to prevent tipping of the articles in the accumulation tray during the stacking procedure, yet does not interfere with the loading of articles onto the accumulation tray. When the order is complete, the attending worker unloads the articles from the accumulation tray. After the articles have been unstacked, the dead plate is returned to the home position ready to accept the next order being stacked onto the accumulation tray. Although the system as disclosed in the above copending patent application is effective, it has been found that it would be desirable to further improve the efficiency of workers unloading articles from the accumulation tray.

SUMMARY OF THE INVENTION

The invention involves the use of an automatically controlled retractable arm that moves along the accumulation tray of the stacking station in order to: 1) ensure organized stacking of articles onto the accumulation tray; as well as 2) facilitate conveyance of articles to the end of the accumulation tray for convenient unloading. An automatically controlled actuator, such as a pneumatic cylinder, is connected to the retractable arm and positions the retractable arm between a down position in which the retractable arm is placed slightly above the accumulation tray for holding and pushing articles in the tray, and a retracted position. In its preferred form, the retractable arm is pivotally mounted for retraction. In the retracted position, the arm provides complete clearance above the accumulation tray where stacked articles are typically located. Another automatic actuator, preferably a cable-type pneumatic cylinder actuator, is used to move the retractable arm linearly along the length of the accumulation tray. The mechanism also preferably includes sensors to coordinate effective movement of the retractable arm for automatic implementation.

The mechanism operates in the following manner. Articles are stacked sequentially onto the accumulation tray in series standing upright on edge, and side-by-side. Before the first article is stacked onto the accumulation tray, the retractable arm is placed in a down position at a home location near the loading end of the accumulation tray. As the articles are stacked onto the accumulation tray, a first side of the retractable arm abuts the first stacked article much like a bookend to stabilize the series of articles being stacked onto the accumulation tray. During the stacking operation, the actuator that drives the retractable arm linearly along the length of the accumulation tray is preferably deactivated (i.e. a dead cylinder). The retractable arm is thus moved incrementally by the endmost article in the series along the accumulation tray as additional articles are stacked in series on the accumulation tray. When the order is complete, or it is otherwise desirable to unload the accumulation tray, the retractable arm automatically retracts, and is returned to the loading end of the accumulation tray slightly upstream of the last stacked article. The retractable arm is then pivoted into the down position so that a second side of the retractable arm is ready to push the series of stacked articles along the length of the accumulation tray towards the unloading end of the tray. In the down position, the retractable arm is driven linearly by the pneumatic actuator to push the series of articles toward the unloading end of the accumulation tray. When a photoelectric sensor senses the presence of articles at the unloading end of the accumulation tray, the pneumatic cylinder is momentarily deactivated. As the attending worker unloads articles from the unloading end of the accumulation tray, the photoelectric eye senses the absence of articles and the pneumatic cylinder is reactivated to again drive the retractable arm, thus supplying more articles to the unloading area of the accumulation tray. The mechanism also includes a proximity switch for the retractable arm which is located near the unloading end of the accumulation tray. When the proximity switch senses the presence of the retractable arm, the retractable arm is returned to the home position near the loading end of the accumulation tray.

It should be apparent to those skilled in the art that the mechanism provides a fully automated manner of preventing tipping of articles being stacked onto the accumulation tray, as well as conveying the articles to the unloading area of the accumulation tray thereby improving the convenience and efficiency of unloading. While it is preferred that system operation be fully coordinated by the electronic controller for the sortation conveying system, it is contemplated that certain aspects of the system operation can be initiated in response to actuation of manual push buttons.

The mechanism is particularly effective when implemented in a discharge stacking station of the type disclosed in the incorporated copending patent application Ser. No. 09/439,862, entitled "Discharge Stacking Station for Sortation Conveying System".

Other features, advantages and objects of the invention should be apparent to those skilled in the art upon reviewing the drawings and the following description thereof.

BRIEF DESCRIPTION OF THE DRAWINGS

FIG. 1 is a schematic top view of a sortation conveying system which includes discharge stacking stations incorporating a combined pushing mechanism and dead plate on the accumulation tray in accordance with the preferred embodiment of the invention.

FIG. 2 is a top view showing some discharge stacking stations in more detail.

FIG. 4 is a detailed top view of a portion of a discharge stacking station constructed in accordance with the invention.

DETAILED DESCRIPTION OF THE INVENTION

Figure 3:
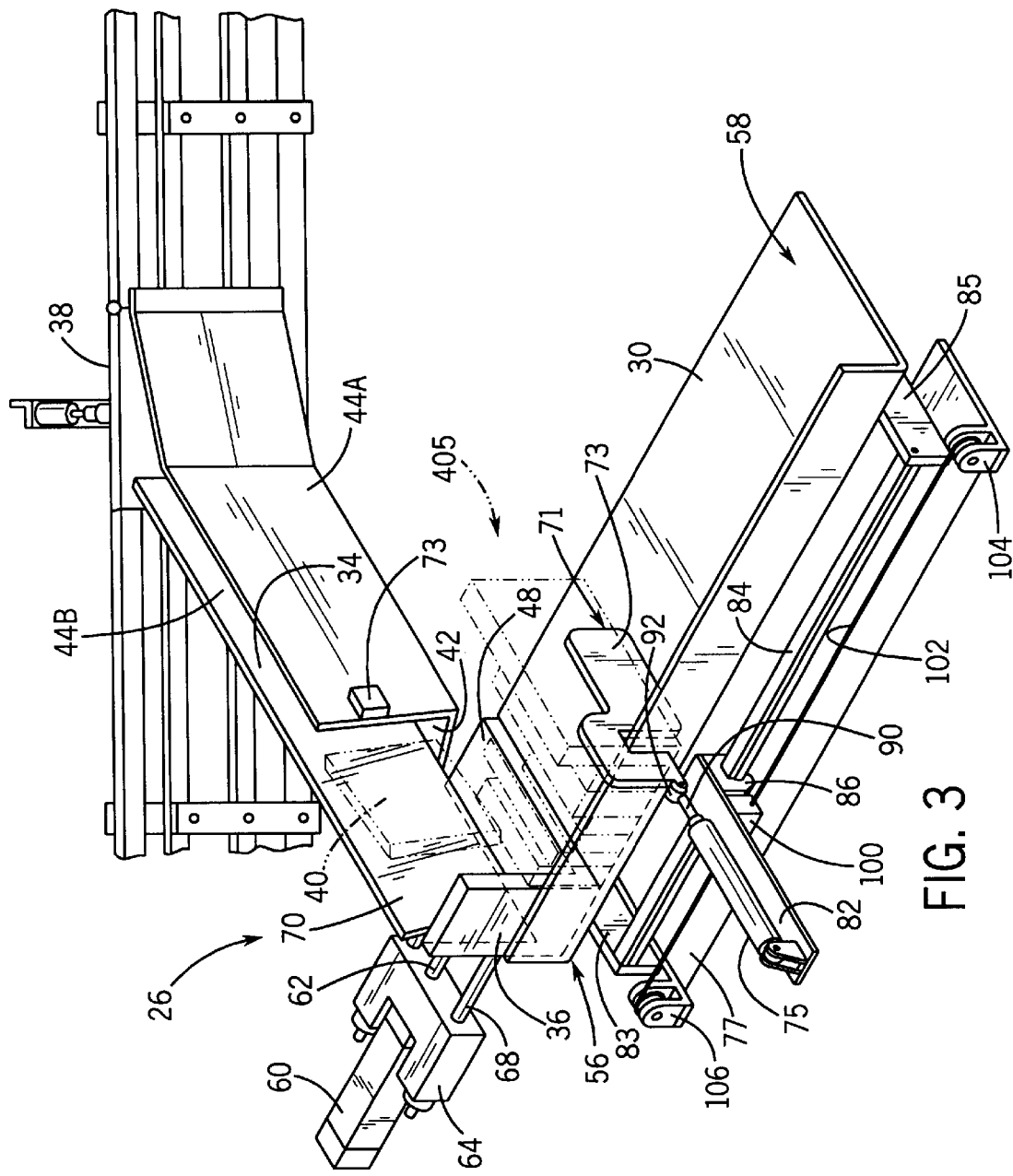
FIG. 3 is a perspective view of a discharge stacking station incorporating a combined pushing mechanism and dead plate in accordance with the preferred embodiment of the invention.

FIG. 1 illustrates a sortation conveying system 10 that is capable of fulfilling orders with intermingled articles having assorted sizes, such as assorted books, intermingled with video cassette containers, compact disc containers, packaged software, or the like. The sortation conveying system includes a core conveyor belt 12 that extends for essentially the entire length of the sortation conveying system, e.g. approximately 300 feet. The core conveyor belt 12 is divided into pockets of equal length (not shown). Each pocket is separated by a cleat on the conveyor belt 12. The core conveyor belt 12 operates at a relatively high rate of speed, for example, approximately 250 parts per minute can be processed and sorted by the system.

The sortation conveying system 10 includes a plurality of inductor stations 18 that are used to load articles onto the core conveyor belt 12. Each of the articles is stacked onto the core conveyor belt 12 standing upright on edge and into an assigned pocket on the core conveyor belt 12. The core conveyor belt 12 then conveys articles in single file for downstream processing and sorting. The core conveyor belt 12 is preferably a continuous motion conveyor belt. The system 10 includes a bar code scanning station 20, and a series of label printing and application stations 22. At the downstream end of the system IO, articles pass through a guide assembly 24 that includes a series of diverting gates that are selectively operated to divert articles passing along the core conveyor belt 12 into one of several discharge stacking stations 26. FIG. 1 shows ten stacking stations 26 each allocated to a specific outgoing order of sorted articles. A computer control system programs the guide assembly 24 to sort the articles traveling down the core conveyor 12 into the appropriate stacking station 26 to fulfill the assigned order. If an article is not required to be diverted into one of the several stacking stations, the article is discharged into a left-over bin 28 from which the articles can be reprocessed at a later time.

FIG. 2 shows three discharge stacking stations 26a, 26b, 26c that are each disposed to stack selected articles sequentially into an associated elongated accumulation tray 30a, 30b, 30c. The preferred configuration of the discharge stacking stations 26a, 26b, 26c is disclosed in more detail in the above-incorporated copending patent application Ser. No. 09/439,862 entitled "Discharge Stacking Station For Sortation Conveying System" by Todd R. Eggebrecht, David A. Remsing and Jason M. Knas, filed on Nov. 122, 1999. Briefly, the articles are conveyed on conveyor belt 12 in the direction of arrow 32. The conveyed articles stand on the core conveyor belt 12 upright on edge and in single file. Each discharge stacking station 26a, 26b, 26c includes a chute 34a, 34b, 34c that transports articles from the core conveyor belt 12 to a reciprocating stacking member 36a, 36b, 36c which is especially designed for stacking the selected article onto the respective elongated accumulation tray 30a, 30b, 30c. Pneumatically-controlled diverting gates 38a, 38b, 38c are controlled by the system computer to divert selected articles into the appropriate chute 36a, 36b, 36c. In FIG. 2, diverting gates 38a and 38b remain in an open position, thus allowing articles to pass on the conveyor belt 12 to station 26c where the diverting gate 38c has been extended to divert the respective article 40 into the chute 34c for stacking station 26c.

Figure 5:
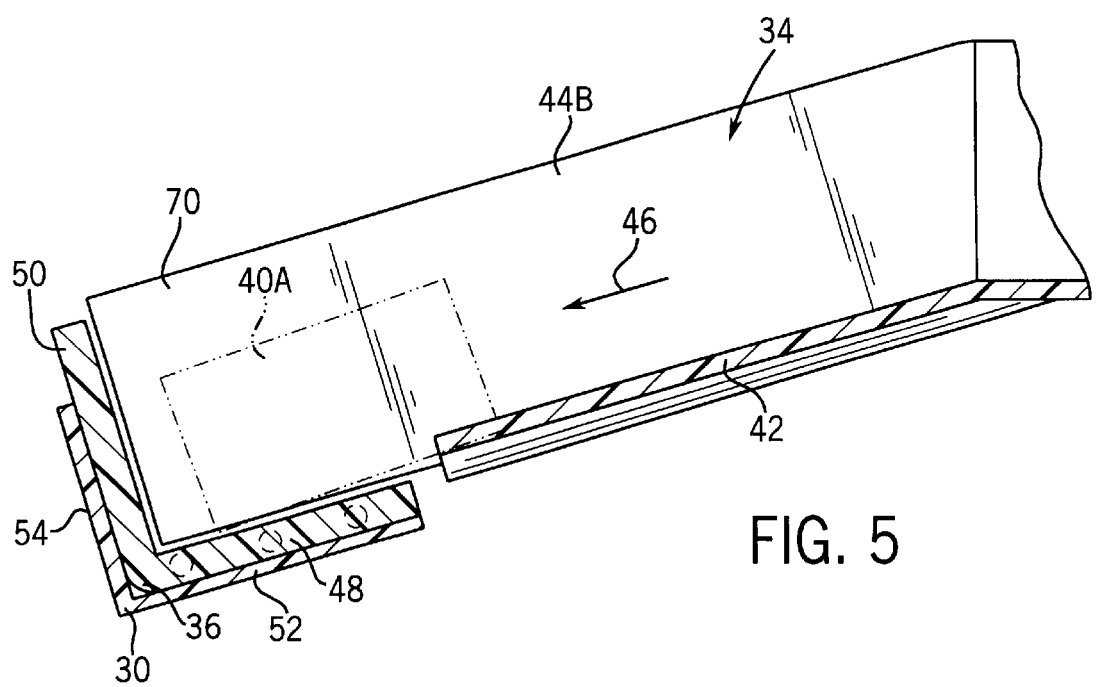
FIG. 5 is a view taken along line 5—5 in FIG. 4.

FIGS. 3–5 show one of the discharge stacking stations 26 in more detail. In FIG. 4, the diverting gate 38 has been actuated to divert articles 40a, 40b into the chute 34. The chute 34 is defined by an inclined wall 42 (e.g. 15°–30°) as well as guide walls 44a, 44b. The guide walls 44a, 44b extend generally upward from the inclined bottom wall 42. The width of the chute 34 should be sufficient to accommodate the widest article sorted by the system. In addition, the angle of inclination of the bottom wall 42 as well as the material of the chute 34 should be selected so that the force of gravity, along with the momentum of the respective article 40, is sufficient to transfer the articles 40 from the core conveyor belt 12 to the reciprocating stacking member 36. FIG. 5 shows article 40a sliding from the bottom wall 42 of the chute 34 in the direction of arrow 46 onto the reciprocating stacking member 36. The stacking member 36 includes a floor 48 and a backstop wall 50 that extends perpendicularly upward from the rear edge of the floor 48. As shown best in FIG. 4, the width of the floor 48 and the backstop wall 50 for the stacking member 36 is preferably the same or greater than the width of the chute 34 between the guide walls 44a, 44b. In this manner, the floor 48 of the reciprocating stacking member 36 fully supports articles stacked from the chute 34 onto the stacking member 36.

Referring to FIG. 5, the elongated accumulation tray 30 preferably includes a bottom wall 52 and a back wall 54. The bottom wall 52 is preferably tilted downwards towards the rear or back side of the tray, so that the force of gravity assists the alignment of articles in the accumulation tray. Note that the back wall 54 preferably extends perpendicularly from the rear edge of the tilted bottom wall 52. Referring to FIG. 3, the elongated accumulation tray 30 is disposed generally horizontally between the loading end 56 of the tray and the unloading end 58 of the tray. The reciprocating stacking member 36 is mounted at the loading end 56 of the accumulation tray 30. As shown best in FIG. 5, the floor of the reciprocating stacking member 36 slides adjacent the portion of the bottom wall 52 of the elongated accumulation tray 30 near the loading end 56 of the tray, and the backstop wall 50 of the reciprocating stacking member 36 slides adjacent a corresponding portion of the back wall 54 of the accumulation tray 30. In order to stack articles onto the accumulation tray 30, the stacking member 36 is reciprocated by a computer controlled actuator 60 which has an arm 62 that is attached to the stacking member 36. The actuator 60 is mounted to an actuator mount 64 that is affixed to a frame for the station 26 via bracket 66, see FIG. 4. Guide rails 68 are also connected to the stacking member 36 and extend parallel with actuator arm 62. The actuator mount 64 includes openings that slidably receive the guide rail 68. As described in more detail in the above-incorporated copending patent application, the purpose of the actuator 60 is to move the reciprocating stacking member 36 between an article receiving position and a retracted position, in order to stack the articles onto the loading end 56 of the tray. A portion of the chute guide wall 44b preferably extends beyond the floor 42 of the chute 34 and above the floor 48 of the reciprocating stacking member 36. This extended portion has been designated by reference number 70 in FIG. 3, and is referred to herein as a stationary stop member. The purpose of the stationary stop member is to push a respective article 40 onto the tray 30 when the reciprocating stacking member 36 is pulled towards the stationary stop member 70. In this manner, the respective article falls on edge on the bottom wall 52 of the accumulation tray to incrementally form a series of articles 40s on the tray 30. When the actuator 60 moves the stacking member 36 back to the original loading position, the stacking member 36 incrementally pushes the stacked article along the tray 30. As the article is dropped and moved along the tray 30, it aligns itself in the tilted tray.

It should be apparent to those skilled in the art that the above-described stacking mechanism is a particularly effective way of stacking articles onto the accumulation tray 30. The invention, however, should not be limited to use in discharge stacking stations 26 that utilize the above-disclosed stacking mechanism. Rather, it is contemplated that the combined pushing mechanism and dead plate disclosed and claimed herein may be used in systems utilizing alternative stacking mechanisms.

Figure 6:
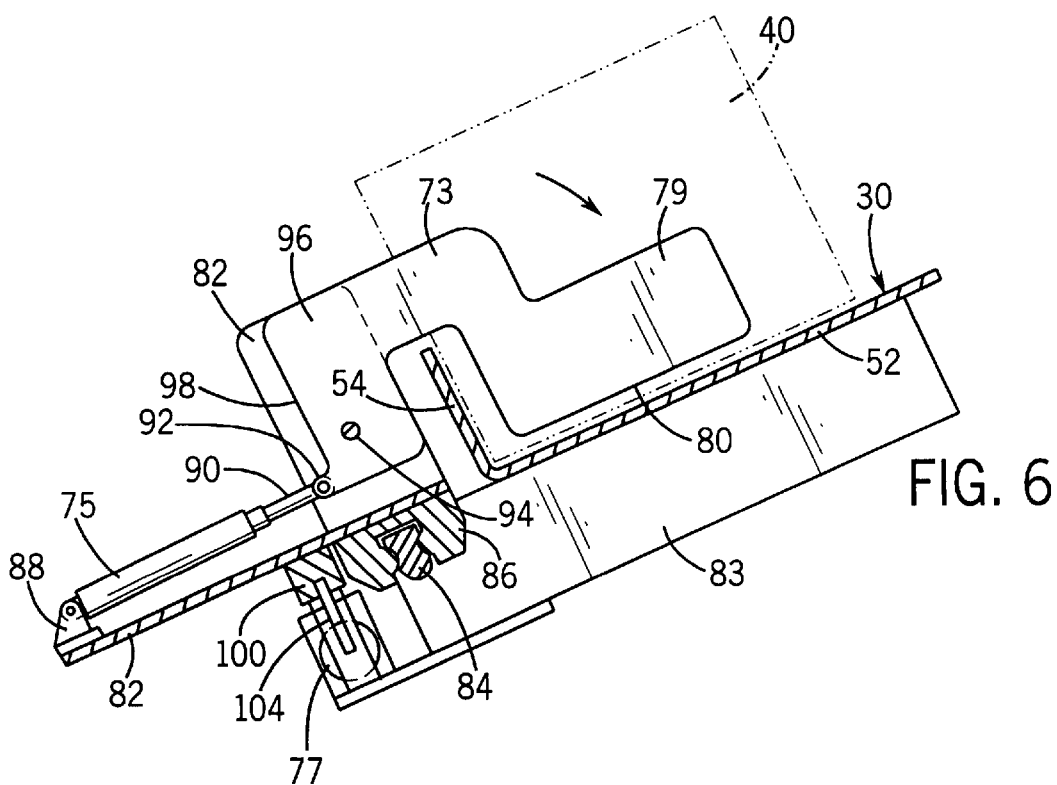
FIG. 6 is a view taken along line 6—6 in FIG. 4 which shows a preferred embodiment of a retractable arm in the down position.
Figure 7:
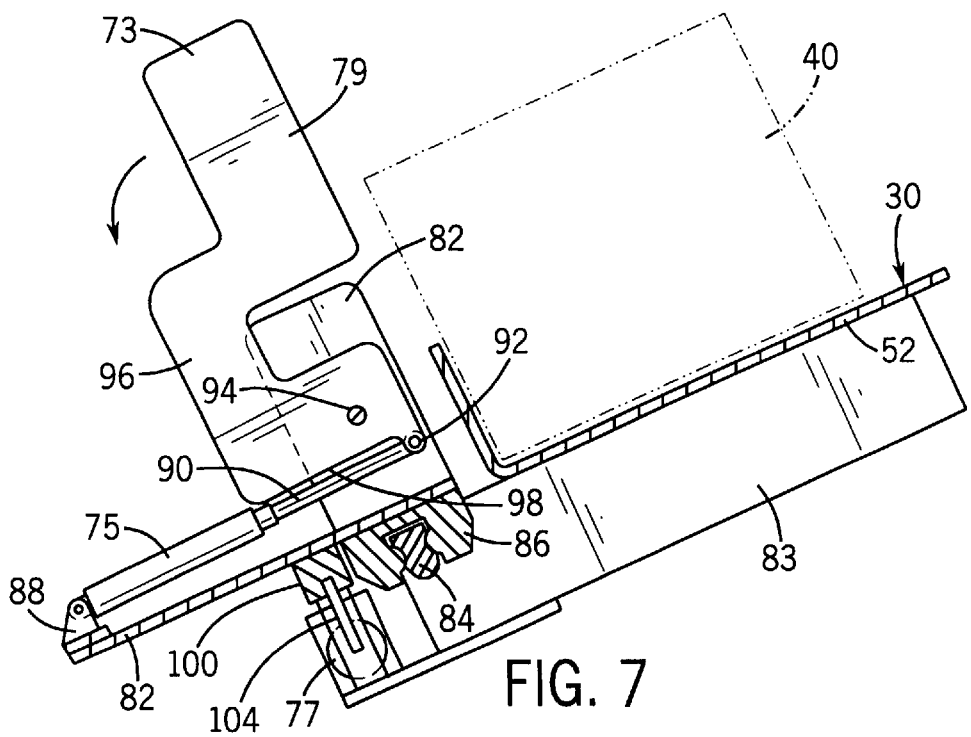
FIG. 7 is a view similar to FIG. 6 showing the retractable arm in a retracted position.

The combined pushing mechanism and dead plate is designated by reference numeral 71, see FIG. 3. The combined pushing mechanism and dead plate 71 includes a retractable arm 73, a retraction actuator 75 that is connected to the retractable arm 73, and a linear motion actuator 77. The retractable arm 73 and the retraction actuator 75 are preferably mounted to a linearly movable support structure 82. The retractable arm 73 is preferably a vertically disposed plate, such as a formed plastic plate. The retractable arm 73 can be made from various materials, however, it is important that the plate 73 be rigid. FIG. 6 shows the retractable arm 73 in a down position, and FIG. 7 shows the retractable arm 73 in a retracted position. The retractable arm 73 includes a main leg 79 that is primarily responsible for holding and pushing articles 40 along the elongated accumulation tray 30. When the retractable arm 73 is in the down position, FIG. 6, a lower edge 80 of the main leg 79 is preferably placed a slight distance above the bottom wall 52 of the accumulation tray 30.

The elongated accumulation tray 30 is mounted on top of two spaced apart support plates 83, 85. Support plate 83 is located at the loading end 56 of the elongated accumulation tray, and support plate 85 is located at the unloading end 58 of the elongated accumulation tray 30. The support plates 83, 85 are located underneath the bottom wall 52 of the elongated accumulation tray 30 and extend rearward beyond the back wall 54 of the accumulation tray 30. A rail 84 is mounted between the plates 83, 85 in the portion of the plates 83, 85 that extend beyond the back wall 54 of the accumulation tray 30. The rail 84 is mounted in parallel with a line defined by the intersection of the back wall 54 and the bottom wall 52 of the accumulation tray 30. The rail 84 therefore extends linearly along a majority of the length of the accumulation tray 30 between the loading end 56 and the unloading end 58. The movable support structure 82 for the retractable arm 73 and retraction actuator 75 is mounted to a bearing block 86. The bearing block 86 is a linear bearing attached to the rail 84 to allow for linear movement of the movable support structure 82 along the rail 84 between the loading end 56 and the unloading end 58 of the accumulation tray 30.

The retraction actuator 75 is preferably a computer-controlled pneumatic cylinder. The base or foot of the pneumatic cylinder 75 is attached to a cylinder mounting bracket 88 on the movable support structure 82. The arm 90 of the retraction actuator 75 is attached to the retractable arm 73, specifically, at an attachment boss 92 on the retractable arm 73. The attachment boss 92 on the retractable arm 73 preferably includes an eyelet or hole that receives a pin to attach the actuator arm 90 to the retraction actuator 75. As shown best in FIGS. 6 and 7, the retractable arm 73 is pivotally connected to the movable support structure 82 via an axle rod 94. The retractable arm 73 includes a connection portion 96 that spans between the pivot location 94 and the main leg 79. The connection portion 96 of the retractable arm 73 is shaped to provide clearance for the back wall 54 of the accumulation tray 30 when the retractable arm 73 is in the down position, see FIG. 6. Note that the connection portion 96 of the retractable arm 73 includes a rear edge 98, which faces rearward when the retractable arm 73 is in the down position, see FIG. 6. The attachment boss 92 on the retractable arm 73 extends rearward beyond the rear edge 98 of the retractable arm 73, which is important in order to provide clearance for the pneumatic cylinder arm 90 on the retraction actuator 75 when the retractable arm 73 is pivoted into the retracted position, see FIG. 7.

The linear motion actuator 77 is preferably a pneumatic cylinder actuator. The purpose of the linear motion actuator 77 is to drive the retractable arm 73 along the length of the rail 84 between a home position located at the loading end 56 of the accumulation tray 30 and a full range position located near the unloading end 58 of the tray 30. A mount 100 is attached to the movable support structure 82 for the retractable arm 73. A cable 102 for the linear motion actuator 77 is connected to the cable mount 100. The cable 102 follows a path around a pulley 104 that is located at the unloading end 58 of the accumulation tray, and a path around a pulley 106 that is located at the loading end 56 of the accumulation tray 30. It should be understood, however, that other types of linear motion actuators 77, such as non-cable-type pneumatic cylinders or other actuators may be used in accordance with the invention.

Figure 8A:
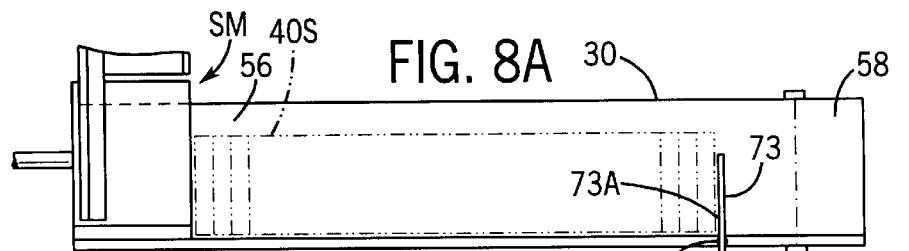
FIGS. 8a–8e are schematic views illustrating the operation of the retractable arm shown in FIGS. 6 and 7 in order to facilitate the stable stacking and convenient and efficient unloading of articles on the accumulation tray.

The operation of the invention is now discussed in connection with FIGS. 8a–8e. In FIG. 8a, the stacking mechanism SM has stacked a series of articles 40s each standing upright on edge and side-by-side, onto the elongated accumulation tray 30. During the stacking procedure, the retractable arm 73 is placed in the down position (see FIG. 6), and acts as a dead plate. As the articles 40 are sequentially stacked onto the accumulation tray 30, a first side of the retractable arm 73 abuts the first loaded articles to prevent the articles 40 from tipping in the tray 30. During stacking of the tray 30, the linear motion actuator 77 is deactivated (i.e., a dead cylinder). The retractable arm 73 is moved incrementally along the rail 84 and along the accumulation tray 30 against the resistance of the dead cylinder 77 as the articles 40s are stacked in series on the accumulation tray 30. When the order is complete, or the accumulation tray 30 is full, the retraction actuator 75 pivots the retractable arm 73 into the retracted position (see FIG. 7). A proximity switch 108 is used to detect when the tray 30 is full, or in other words to detect the presence of the retractable arm 73 at the full range position near the unloading end 58 of the accumulation tray 30. FIG. 8a shows the retractable arm 73 at the location of the proximity sensor 108. As mentioned, the next step in the operation is for the retraction actuator 75 to pivot the retractable arm 73 into the retracted position.

Figure 8B:
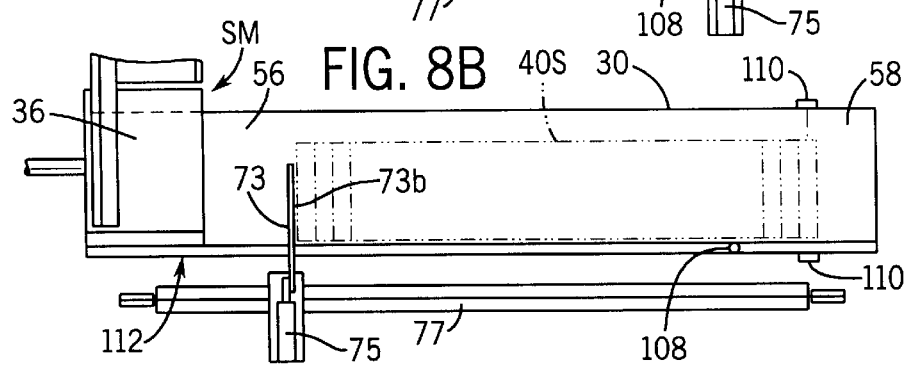
Figure 8C:
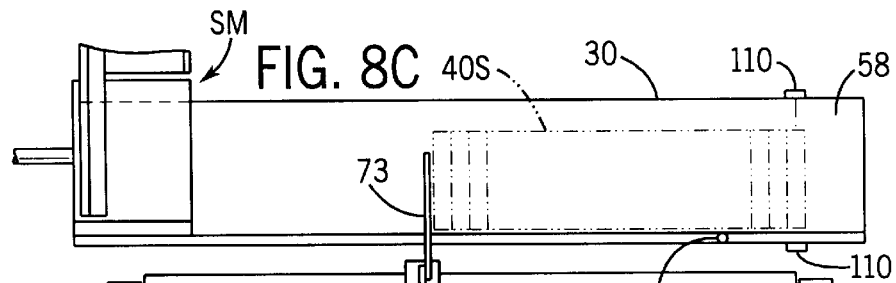
Figure 8D:
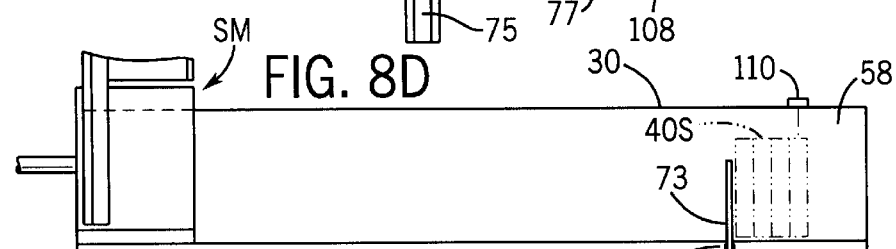
Figure 8E:
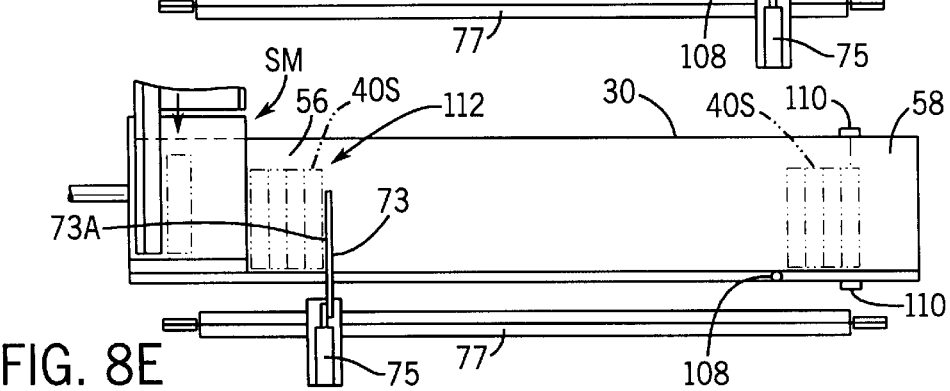

Referring to FIG. 8b, the linear motion actuator 77 is actuated and returns the retractable arm 75 to the home position at the loading end 56 of the accumulation tray 30, with the arm 73 in a retracted position (see FIG. 7). The preferred home location is designated by reference numeral 112 on FIG. 8b. Coordinating the retraction of the stacking member 36 with the return of the retractable arm 73 for the combined pushing mechanism and dead plate allows the retractable arm 73 to be positioned at the home location 112 and extended into the down position (see FIG. 6), thus presenting a second side 73b of the retractable arm 73 to the series of articles 40s on the accumulation tray 30. The linear motion actuator 77 is then actuated to drive the retractable arm 73 from the loading end 56 to the unloading end 58 of the accumulation tray 30, and thus push the articles 40s towards the unloading end 58 of the accumulation tray 30. A sensor 110 (e.g. a photoelectric sensor) is located at the unloading end 58 of the accumulation tray. When the sensor 110 senses the presence of articles 40s, the control system instructs the linear motion actuator 77 to stop movement of the retractable arm 73 towards the unloading end 58 of the accumulation tray 30. Now referring to FIG. 8c, after some of the articles 40 have been unstacked, the linear motion actuator 77 is again activated to push the arm 73 and the articles 40s towards the unloading end 58 of the accumulation tray 30 until the sensor 110 again senses the presence of articles. This type of incremental advancement continues as articles are unloaded from the accumulation tray. FIG. 8d shows a time in the cycle when the retractable arm 73 has advanced towards the unloading end 58 of the accumulation tray 30 all the way to the location of the proximity switch 108. In the next step in the cycle, the linear motion actuator 77 returns the retractable arm 73 to a home position 112 near the loading end 56 of the tray 30 so that the first side 73a of the arm 73 is ready to accept articles as a dead plate. The retractable arm 73 preferably remains in the down position (see FIG. 6) when it is moved from the position shown in FIG. 8d to the position shown in FIG. 8e. As discussed previously with respect to FIG. 8a, the linear motion actuator 77 is deactivated when articles are stacked on the accumulation tray 30 in order to allow the stacked articles 40s to incrementally move the arm 73 against the resistance of the dead cylinder 77. The cycle continues as described above with respect to FIGS. 8a–8e until the order is complete, at which time the retractable arm 73 is positioned at the home position 112 (FIG. 8e) ready to accept a new order of articles being stacked onto the accumulation tray 30.

Various alternatives and other embodiments are contemplated as being within the scope of the following claims which particularly point out and distinctly claim the subject matter regarded as the invention.

We claim:

1. A discharge stacking station for an article sortation conveying system, comprising:

an accumulation tray having a loading end and an unloading end;

an article supply arrangement that receives articles from the sortation system and places articles on the loading end of the accumulation tray, wherein the article supply arrangement advances each article to a predetermined location on the loading end of the accumulation tray by advancing successive articles to the predetermined location;

a retractable arm;

a linear motion actuator that drives the retractable arm along the accumulation tray between a home position at the loading end of the accumulation tray and a full range position near the unloading end of the accumulation tray; and a retraction actuator connected to the retractable arm that moves the retractable arm between a down position in which the retractable arm is located above the accumulation tray for holding and pushing articles along the accumulation tray and a retracted position in which the retractable arm is clear of space above the accumulation tray occupied by articles stacked on the tray;

wherein the linear motion actuator is:

deactivated when the retractable arm is moved to its down position by the retraction actuator and articles are being advanced onto the accumulation tray by the article supply arrangement to form a first stack of articles located between a first side of the retractable arm and the article supply arrangement, wherein the first side of the retractable arm engages the endmost article to support the first stack of articles and wherein deactivation of the linear motion actuator functions to enable the retractable arm to advance toward its full range position relative to the accumulation tray as successive articles are supplied to the first stack of articles by the article supply arrangement;

activated when the retractable arm reaches its full range position and is moved to its retracted position by the retraction actuator, to drive the retractable arm along the accumulation tray in the direction towards the loading end of the tray to return the retractable arm to the home position wherein the retractable arm is located between the loading end of the accumulation tray and the first stack of articles;

activated when the retractable arm is moved to its down position by the retraction actuator, to drive the retractable arm along the accumulation tray in the direction towards the unloading end of the tray to engage the first stack of articles with a second side of the retractable arm and advance the first stack of articles toward the unloading end of the tray; and activated when the retractable arm is moved to its retracted position by the retraction actuator, to return the retractable arm to its home position wherein subsequent articles are advanced onto the accumulation tray by the article supply arrangement into engagement with the first side of the retractable arm to form a second stack of articles.

2. A discharge stacking station as recited in claim 1 wherein the retractable arm is pivotally mounted so that the retraction actuator is operable to pivot the retractable arm between the down position and the retracted position.

3. A discharge stacking station for an article sortation conveying system in which the stacking station stacks articles sequentially, comprising:

an accumulation tray having a loading end and an unloading end, wherein articles are stacked sequentially onto the accumulation tray at the loading end;

a retractable arm;

a linear motion actuator that drives the retractable arm along the accumulation tray between a home position at the loading end of the accumulation tray and a full range position near the unloading end of the accumulation tray;

a retraction actuator connected to the retractable arm that moves the retractable arm between a down position in which the retractable arm is located above the accumulation tray for holding and pushing articles along the accumulation tray and a retracted position in which the retractable arm is clear of space above the accumulation tray occupied by articles stacked on the tray; and a stacking mechanism, comprising a reciprocating stacking member located at the loading end of the accumulation tray, the reciprocating stacking member having a floor that is disposed to move relative to the accumulation tray; an actuator that moves the reciprocating stacking member between an article receiving position and a retracted position; a stationary stop member located generally above the floor of the reciprocating stacking member and disposed generally perpendicular to the accumulation tray such that a pushing side of the stationary stop member generally faces towards the unloading end of the accumulation tray; and a chute that receives articles one by one from a core conveyor in singular fashion and transfers the respective article onto the reciprocating stacking member at a location adjacent to the pushing side of the stationary stop member when the reciprocating stacking member is positioned in the article receiving position; wherein the actuator moves the reciprocating stacking member towards the stationary stop member to the retracted position after the respective article has been loaded onto the reciprocating stacking member thereby causing the article to fall from the floor of the reciprocating stacking member onto the accumulation tray at the loading end of the tray.

4. A discharge stacking station for an article sortation conveying system, comprising:

an accumulation tray having a loading end and an unloading end, wherein the accumulation tray has a bottom wall and a stop wall that extends upwardly from the bottom wall, wherein the bottom wall of the accumulation tray is oriented at an angle relative to horizontal and wherein the stop wall extends upwardly from a lowermost location defined by the bottom wall of the accumulation tray;

an article supply arrangement that supplies articles from the sortation system to the accumulation tray, wherein the accumulation tray extends along a longitudinal axis and wherein the article supply arrangement is constructed and arranged to supply articles to the accumulation tray in a direction transverse to the longitudinal axis of the accumulation tray, wherein the articles move transversely relative to the accumulation tray into engagement with the stop wall to position the articles on the accumulation tray, wherein articles supplied to the accumulation tray are biased by gravity into engagement with the stop wall;

a stack forming mechanism engageable with the articles for forming the articles into a stack on the accumulation tray by advancing the articles on the accumulation tray;

a pivotable retractable arm;

a linear motion actuator that drives the retractable arm along the length of the accumulation tray between a home position at the loading end of the accumulation tray and a full range position near the unloading end of the accumulation tray; and a retraction actuator connected to the retractable arm that pivotably moves the retractable arm between a down position in which the retractable arm is placed above the accumulation tray for holding and pushing articles along the accumulation tray and a retracted position in which the retractable arm is clear of space above the accumulation tray occupied by articles stacked on the tray;

wherein the pivotable retractable arm includes a main section that is constructed and arranged to hold and push articles on the accumulation tray and a connection section that spans between a pivot location for the retractable arm and the main section, wherein the connection section defines a clearance space within which the stop wall of the tray is received when the retractable arm is in the down position.

* * * * *